United States Patent [19]

Santandrea et al.

[11] Patent Number: 4,878,292

[45] Date of Patent: Nov. 7, 1989

[54] ARMATURE PAPER FEEDING, CUTTING, AND INSERTING DEVICE

[75] Inventors: Luciano Santandrea; Massimo Lombardi, both of Florence, Italy

[73] Assignee: Axis S.p.A., Florence, Italy

[21] Appl. No.: 182,955

[22] Filed: Apr. 18, 1988

[30] Foreign Application Priority Data

May 6, 1987 [IT] Italy ............................ 67390 A/87

[51] Int. Cl.⁴ .............................................. B23P 19/04
[52] U.S. Cl. ...................................... 29/734; 29/33 L; 29/564.2; 29/705; 83/262; 83/393
[58] Field of Search ................ 83/399, 241, 262, 263, 83/268, 269, 393; 29/734, 564.2, 564.6, 564.7, 564.8, 705, 771, 33 L; 493/3, 22, 25, 344, 345; 227/5, 84, 85

[56] References Cited

U.S. PATENT DOCUMENTS

| | | | |
|---|---|---|---|
| 3,163,065 | 12/1964 | Kolodgy et al. | 83/241 X |
| 3,514,836 | 6/1970 | Mason | 29/205 |
| 3,634,932 | 1/1972 | Mason | 29/734 X |
| 3,763,983 | 10/1973 | James | 83/268 X |
| 3,829,953 | 8/1974 | Lauer et al. | 29/734 |
| 4,136,433 | 1/1979 | Copeland et al. | 29/564 |
| 4,389,011 | 6/1983 | Lovibond | 227/5 |
| 4,449,289 | 5/1984 | Kindig | 29/596 |

FOREIGN PATENT DOCUMENTS 1574500  7/1969  France .
 736281  5/1980  U.S.S.R. ............................ 29/734

*Primary Examiner*—Steven C. Bishop
*Attorney, Agent, or Firm*—Eric C. Woglom; Robert R. Jackson

[57] ABSTRACT

A machine for driving and variable length cutting of the paper used in the armature of an electric motor rotor. The machine comprises a feed distance covered by the paper between shaping rollers, over which a pressure wheel is located which pushes the paper against a ledge and then slips. A paper cutting blade is inserted between the wheel and the ledge. Transfer devices located between the blade and the ledge transfer the cut paper to a bending fixture, which gives the paper the shape of the rotor slot. The paper is pushed into the rotor slot by inserting devices. The rotor is moved from the conveyor on which it is supplied to a suitable position to receive the paper. Locking elements connected to the ledge vary the length of the cut paper with respect to the height of the rotor slots where the paper is inserted.

11 Claims, 4 Drawing Sheets

ARMATURE PAPER FEEDING, CUTTING, AND INSERTING DEVICE

BACKGROUND OF THE INVENTION

This invention relates to a machine for driving and variable length cutting of the paper which is used as insulation in the armatures of electric motor rotors.

One of the purposes of the invention is to realize a machine able to minimize length differences among the insulating papers used on armatures of a given size.

Another purpose of the invention is to provide a machine able to automatically vary the length of the insulating paper according to the rotor on which the armature will be fitted.

SUMMARY OF THE INVENTION

For these purposes, and others that will be better appreciated from the description that follows, the invention provides a machine for driving and variable length cutting of the paper used as insulation in the armatures of electric motor rotors. The machine includes shaping rollers feeding paper to a feed distance, after which the paper passes to a pressure wheel which pushes the paper against a ledge. A paper cutting blade is inserted between the wheel and the ledge. Transfer devices are located between the blade and the ledge for transferring the cut paper to a bending fixture which gives the paper the shape of the rotor slot into which it is pushed by paper inserting devices. A conveyor is provided for positioning the rotor, and detecting devices for measuring the rotor slot height are also provided. The detecting devices are connected directly to vary the position of the ledge to equalize the length of the cut paper with the height of the rotor slots.

DETAILED DESCRIPTION OF THE PREFERRED EMBODIMENTS

Figure 1:
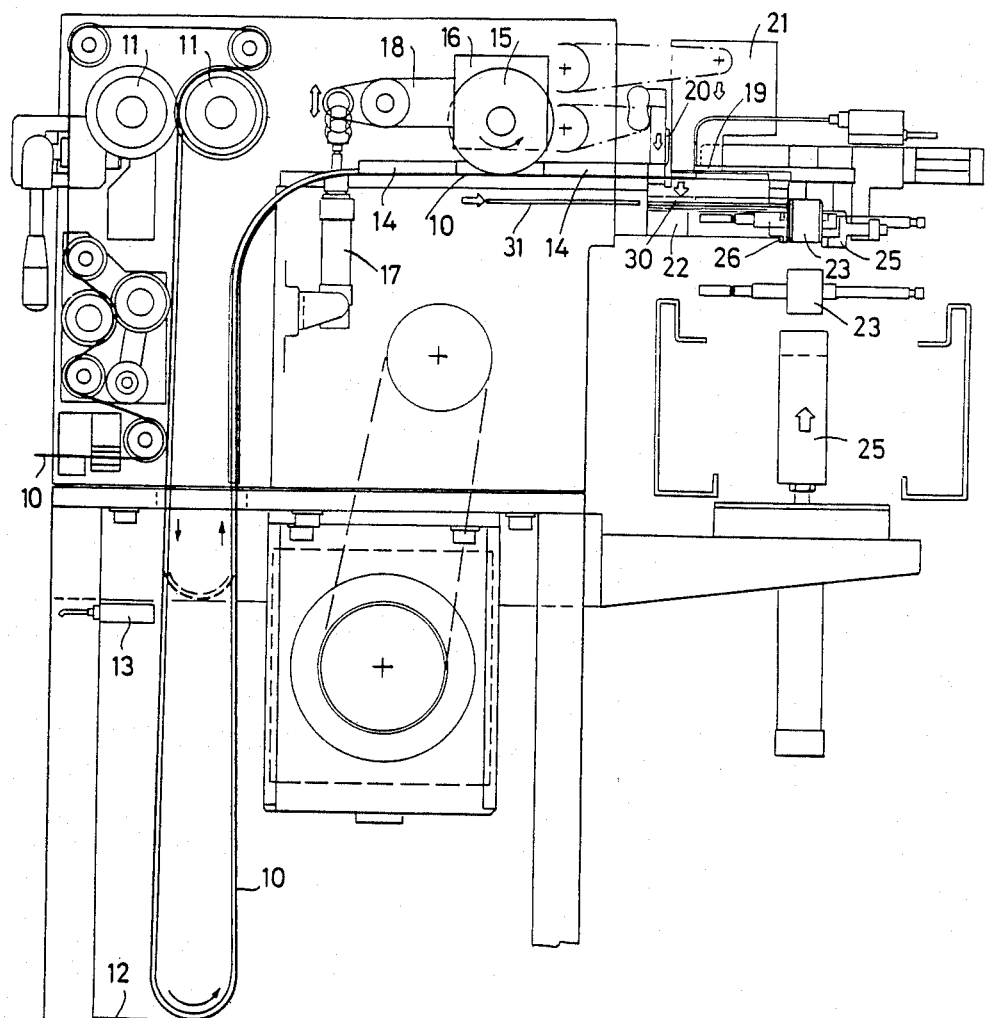
FIG. 1 is a longitudinal sectional view of an illustrative embodiment of the machine of this invention.

The paper belt 10 is continuously fed between two rollers 11 (see FIG. 1) from an external paper supply coil or roll (not illustrated). Rollers 11 shape and engrave the paper in a predetermined pattern such that when the paper is subsequently inserted in the slots of the rotor, it conforms to the shape of the slot in the best possible way. The paper belt or web 10, formed by the rollers 11, performs a free downward descent, forming a loop which is limited in size by two photocells 12 and 13, which give the maximum loop length and the minimum loop length, respectively.

When paper 10 reaches the loop top, two paper guides 14, exact with respect to the paper's width, guide the paper while a wheel 15, covered with wear-resisting material and rotated by a geared motor 16, pushes a paper onward, by means of frictional engagement of the paper. A cylinder 17, the pressure of which is adjusted by a gauge, operates the lever 18 on which geared motor 16 is assembled. Geared motor 16 holds paper drive wheel 15.

Figure 3:
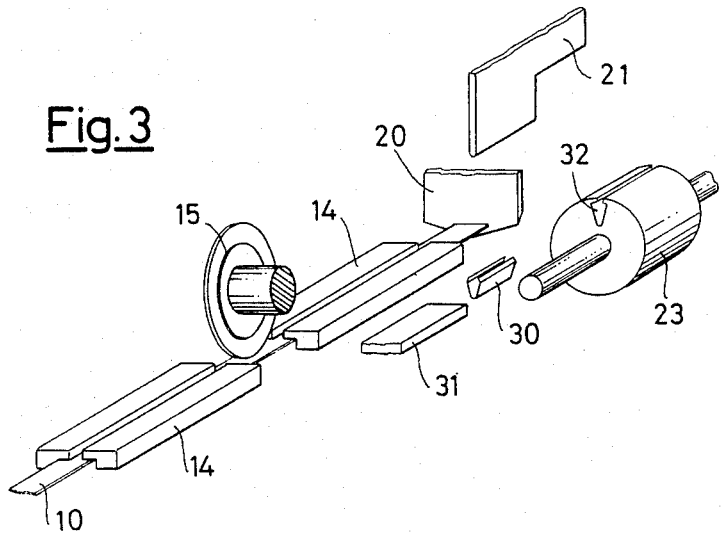
FIG. 3 is a perspective view of a portion of the machine.

The friction between wheel 15 and paper 10 makes the paper slide between guides 14 until it rests against ledge 19. A kinematic motion controls a cutting blade 20, which cuts the paper. Plate 21 pushes the cut paper downward and inserts it in a portion 22 of the fixture having the shape of the rotor slot, thus carrying out a longitudinal median bending of the paper and imparting a definite shape 30 (FIG. 3). At this point, an inserting device 31 pushes the shaped paper into the slot 32 of rotor 23.

When the cutting blade goes up again, wheel 15 (which was slipping on the remaining paper against cutting blade 20), feeds the paper at the maximum speed, making it hit against ledge 19. The paper waits to be cut again, having reached the desired length without mistakes, and rubber wheel 15 begins to slip again.

Figure 1A:
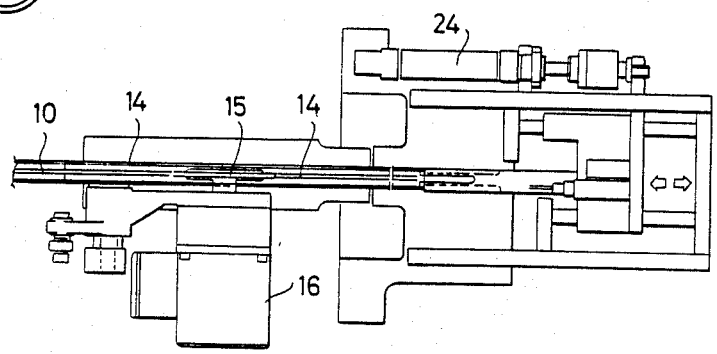
FIG. 1a is a partial top view of the machine of FIG. 1.
Figure 2A:
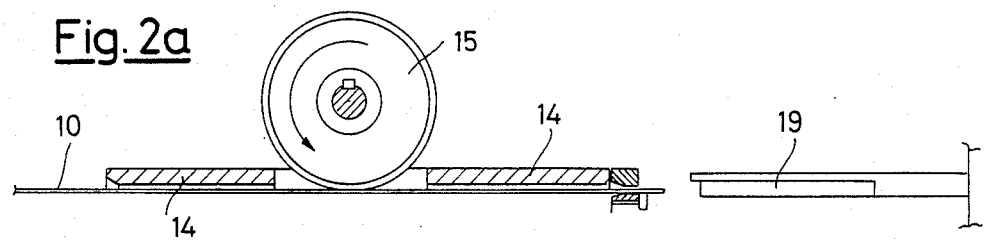
FIGS. 2a, 2b, and 2c are enlarged views of a portion of the machine illustrated in FIG. 1 showing three different operating positions.
Figure 2B:
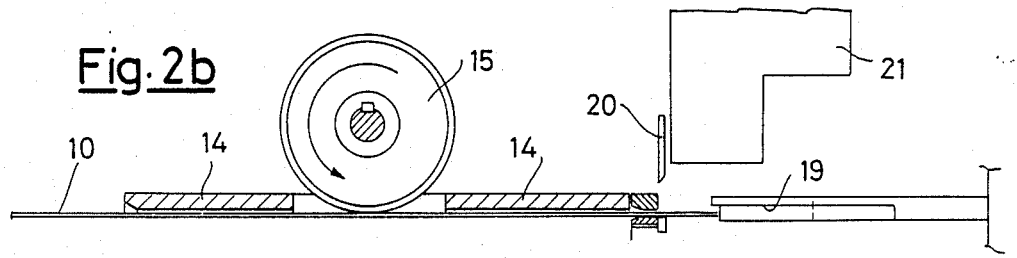
Figure 2C:
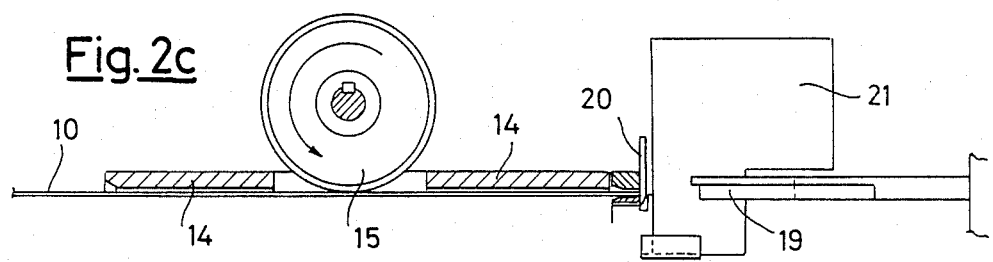
Figure 4:
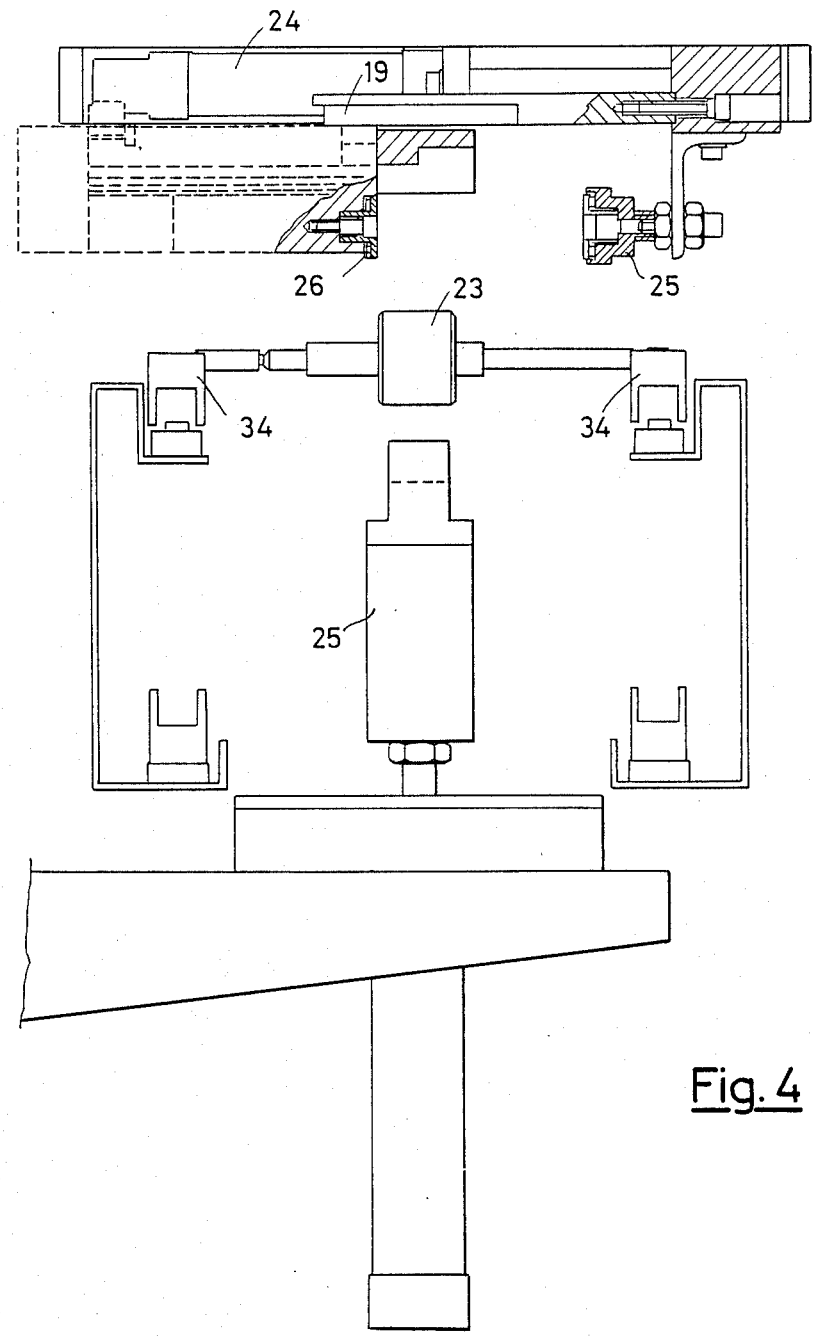
FIGS. 4 and 5 are enlarged views of a portion of the machine shown in two different operating positions.
Figure 5:
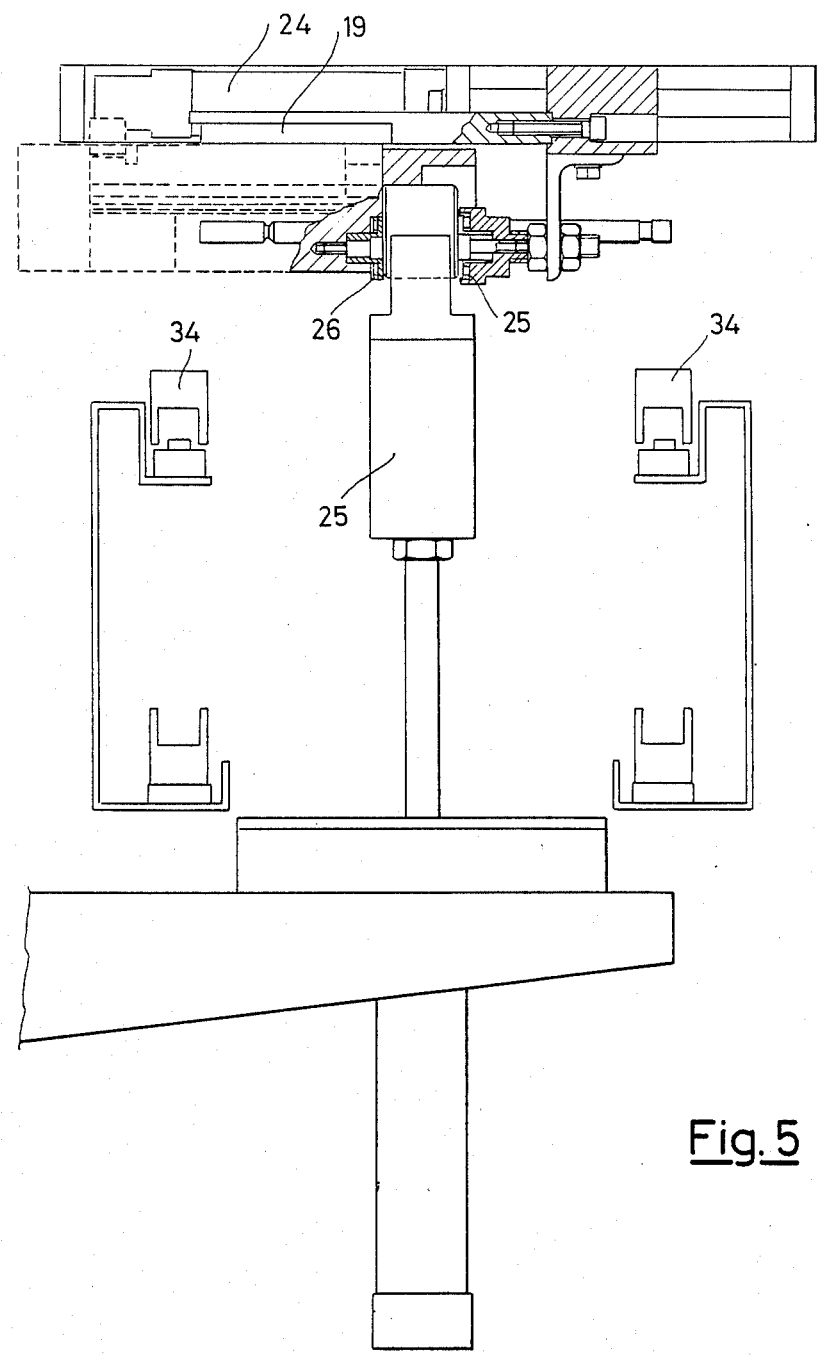

When the insulation of rotor 23 is complete, ledge 19, which is controlled by cylinder 24 (FIG. 1a), moves backward and the jaw 25 puts rotor 23 back on conveyor 34 (FIG. 4). Conveyor 34 performs a step, presents a new rotor 23, and lifts it in the paper insertion area. The cylinder 24, with thrust blocks 25 and 26, bears on the new rotor 23. The thrust blocks 25 and 26 are connected by a predetermined dimension to paper ledge 19, that is according to the height of the armature. Thrust blocks 25 and 26, and ledge 19, will conform themselves to such height, thus determining the length of cut paper, which must be equal to the height of the armature, and also making up for the height tolerance of the armature of the rotor.

With regard to the paper driving system, a cylinder 17, the pressure of which is adjusted by a gauge, operates lever 18 on which geared motor 16 is assembled. The geared motor holds drive wheel 15 of the paper 10. Paper 10, having been inserted in guides 14, is pushed onto ledge 19 by wheel 15; as soon as it reaches ledge 19, wheel 15 slips on paper 10. The machine carries out the shaping, cutting, and insertion functions as described above. When the operators reset, the paper is released, and the machine performs another step forward.

Regarding the automatic detection of the length of the paper, which must be equal to the height of the armature, jaw 25 lifts rotor 23 off of the conveyor, and cylinder 24, by thrust blocks 25, pushes rotor 23 until it bears against thrust blocks 26, which are on the side of the paper shaping fixture 22.

The ledge 19, where the paper 10 bears and is fed by wheel 15, is assembled integral to cylinder 24.

The length of the paper for each rotor 23 equal to the armature height of that rotor is thus determined; the differences which could have existed between the paper and the armature, caused by the armature's wide tolerance, are thus recovered.

I claim:

1. A machine for driving and variable length cutting of a paper web for use in the armature of an electric motor rotor comprising:

a variable position ledge;

a pressure drive wheel which pushes an end edge of said paper web against said ledge by means of frictional engagement of the paper, and which then slips against said paper;

means for feeding a paper web to said pressure wheel;

means for cutting said paper web between said ledge and said pressure wheel to produce a paper sheet;

means for shaping said paper sheet to fit in a slot of said rotor;

means for transferring said paper sheet to said shaping means;

means for conveying said rotor to a position suitable to receive the shaped paper sheet; and means for inserting said shaped paper sheet into said rotor slot.

2. The machine of claim 1 wherein said means for feeding said paper web to said pressure wheel comprises a set of paper-shaping rollers.

3. The machine of claim 1 wherein said paper web extends downward, forming a slack loop, after exiting said means for feeding paper to said pressure wheel, the minimum and maximum downward extension being regulated by sensors spaced vertically apart by a predetermined distance.

4. The machine of claim 3 wherein said sensors comprise photocells.

5. The machine of claim 1 wherein said means for conveying said rotor includes locking elements.

6. The machine of claim 1 further comprising means for detecting the length of said rotor slot, said detecting means being connected directly to said ledge.

7. The machine of claim 6 wherein said detecting means forms part of said means for positioning said rotor to receive said shaped paper sheet.

8. The machine of claim 9 wherein said means for positioning said rotor comprises thrust blocks which pinch the rotor adjacent the ends of the slot, at least one such block being movable and connected to an actuator cylinder which positions said ledge, with respect to said cutting means, at a distance substantially equal to the distance between said thrust blocks.

9. The machine of claim 1 wherein said pressure wheel is kept in contact with said paper web by means of a lever operated by an actuator cylinder.

10. A method for driving and variable length cutting of a paper web for use in the armature of an electric motor rotor comprising the steps of:

feeding said paper web substantially continuously from a paper supply to a slack loop;

intermittently withdrawing said paper web from said slack loop with a pressure drive wheel;

pushing an end edge of said paper web against a variable position ledge by frictionally engaging said paper web with said pressure drive wheel so that said pressure drive wheel slips relative to said paper web when said end edge of said paper web is against said variable position ledge;

cutting said paper web between said ledge and said pressure drive wheel to produce a paper sheet;

shaping said paper sheet to fit in a slot of said rotor;

positioning said rotor in a position suitable to receive the shaped paper sheet; and inserting said shaped paper sheet into said rotor slot.

11. The method of claim 10 further comprising the step of detecting the length of said rotor slot prior to cutting said paper web to produce a paper sheet.

* * * * *